(12) United States Patent
Ku et al.

(10) Patent No.: US 12,061,502 B2
(45) Date of Patent: Aug. 13, 2024

(54) EXPANDABLE THERMAL SOLUTION FOR LAPTOPS

(71) Applicant: Intel Corporation, Santa Clara, CA (US)

(72) Inventors: Jeff Ku, Taipei (TW); Tin Poay Chuah, Bayan Baru (MY); Howe Yin Loo, Bayan Lepas (MY); Chin Kung Goh, Pulau Pinang (MY); Yew San Lim, Gelugor Pulau (MY); Cora Shih Wei Nien, Taipei (TW)

(73) Assignee: Intel Corporation, Santa Clara, CA (US)

( * ) Notice: Subject to any disclaimer, the term of this patent is extended or adjusted under 35 U.S.C. 154(b) by 149 days.

(21) Appl. No.: 17/368,851

(22) Filed: Jul. 7, 2021

(65) Prior Publication Data

US 2021/0333848 A1 Oct. 28, 2021

(51) Int. Cl.
  *G06F 1/20* (2006.01)
  *G06F 1/16* (2006.01)

(52) U.S. Cl.
  CPC ............ *G06F 1/203* (2013.01); *G06F 1/1616* (2013.01)

(58) Field of Classification Search
  CPC .............................. G06F 1/203; G06F 1/1616
  See application file for complete search history.

(56) References Cited

U.S. PATENT DOCUMENTS

| | | | | |
|---|---|---|---|---|
| 4,498,530 A * | 2/1985 | Lipschutz | ........... | H01L 23/4338 361/717 |
| 5,552,960 A * | 9/1996 | Nelson | ..................... | G06F 1/203 174/16.3 |
| 6,181,554 B1 * | 1/2001 | Cipolla | ................. | G06F 1/1616 361/679.55 |
| 6,437,978 B1 * | 8/2002 | Ozaki | ..................... | G06F 1/203 400/82 |
| 6,496,369 B2 * | 12/2002 | Nakamura | ............ | G06F 1/1656 312/236 |
| 6,599,090 B2 * | 7/2003 | Ozaki | ..................... | G06F 1/203 415/206 |
| 7,327,568 B2 * | 2/2008 | Lin | ........................... | G06F 1/20 361/679.48 |
| 7,532,475 B2 * | 5/2009 | Michel | ................ | H01L 23/4338 257/713 |
| 11,262,821 B1 * | 3/2022 | North | ..................... | G06F 1/3296 |
| 11,262,822 B1 * | 3/2022 | North | ................. | H05K 7/20409 |
| 11,320,876 B1 * | 5/2022 | North | ...................... | G06F 1/166 |
| 11,592,882 B2 * | 2/2023 | Nicholas | ............ | F28D 15/0208 |
| 11,630,494 B2 * | 4/2023 | Huang | ................... | G06F 1/1626 361/688 |
| 11,874,713 B2 * | 1/2024 | Chen | ................... | H05K 7/20172 |

(Continued)

*Primary Examiner* — Robert J Hoffberg
(74) *Attorney, Agent, or Firm* — Viering, Jentschura & Partner mbB; Benjamin L. von Rueden

(57) ABSTRACT

According to the present disclosure, a laptop may be provided with a compartment including a moveable segment, an expandable heat exchanger with a movable section, and an expandable fan unit. The release of the movable segment of the compartment from a lower portion of the compartment produces an opening in the compartment and the movable section of the expandable heat exchanger is extended downward, and the expandable fan unit is lowered when the movable segment of the compartment is released.

10 Claims, 18 Drawing Sheets

(56) References Cited

U.S. PATENT DOCUMENTS

| | | | | |
|---|---|---|---|---|
| 2013/0027873 A1* | 1/2013 | Chen | .................. | G06F 1/203 |
| | | | | 361/695 |
| 2014/0188283 A1* | 7/2014 | Ghosh | ................ | G06F 1/203 |
| | | | | 700/275 |
| 2018/0059744 A1* | 3/2018 | Brazel | ............... | H05K 7/20336 |
| 2020/0337179 A1* | 10/2020 | Ku | ................ | H05K 7/2039 |
| 2023/0229213 A1* | 7/2023 | Chen | ................ | H05K 7/20172 |
| | | | | 361/695 |

* cited by examiner

EXPANDABLE THERMAL SOLUTION FOR LAPTOPS

BACKGROUND

For premium laptop computers, manufacturers will use high-end central processing units (CPUs) and graphics processing units (GPUs) that generate a significant amount of heat. Unlike a typical desktop that may have a CPU tower that allows for plenty of fans and ventilation, laptops have chassis that have a clamshell design. For laptops, their clamshell profile and weight are of paramount importance. A laptop by design needs to be as slim and portable as possible, which means that design engineers cannot use large fans for better ventilation, because they require a large chassis. A lower compartment for a clamshell system of a premium laptop may have a thickness in the range of 6 to 8 mm, with an overall thickness for the clamshell in the range of 9 to 12 mm. In any event, a laptop's clamshell limiting form factor must provide space for a heat transfer solution.

A variety of solutions for cooling laptops have been offered and employed by users, including laptop stands and coolers that come in a variety of shapes and sizes, which have varying degrees of effectiveness. The stands and coolers will typically provide a space or fans for cooling at the underside of the laptop. These laptop accessories have the drawback of needing to be transported with the laptop and many users may prefer not to do so.

Some laptop manufactures have recently offered a solution that includes an expandable laptop chassis, in which the lower compartment of the clamshell includes a moveable portion that opens the lower compartment to provide greater ventilation and cooling from the ambient air. In this solution, the ingress of the ambient air for cooling the electronic components of the laptop and the egress of the heated air being expelled by a fan is not limited to the air vents that are typically built into the lower compartment. Unlike laptop accessories, an expandable chassis offers a built-in cooling solution, but one that may not offer the cooling effectiveness necessary to prevent overheating of the laptop during prolonged use.

BRIEF DESCRIPTION OF THE DRAWINGS

In the drawings, like reference characters generally refer to the same parts throughout the different views. The drawings are not necessarily to scale, emphasis instead generally being placed upon illustrating the principles of the present disclosure. The dimensions of the various features or elements may be arbitrarily expanded or reduced for clarity. In the following description, various aspects of the present disclosure are described with reference to the following drawings, in which.

DETAILED DESCRIPTION

Figure 1A:
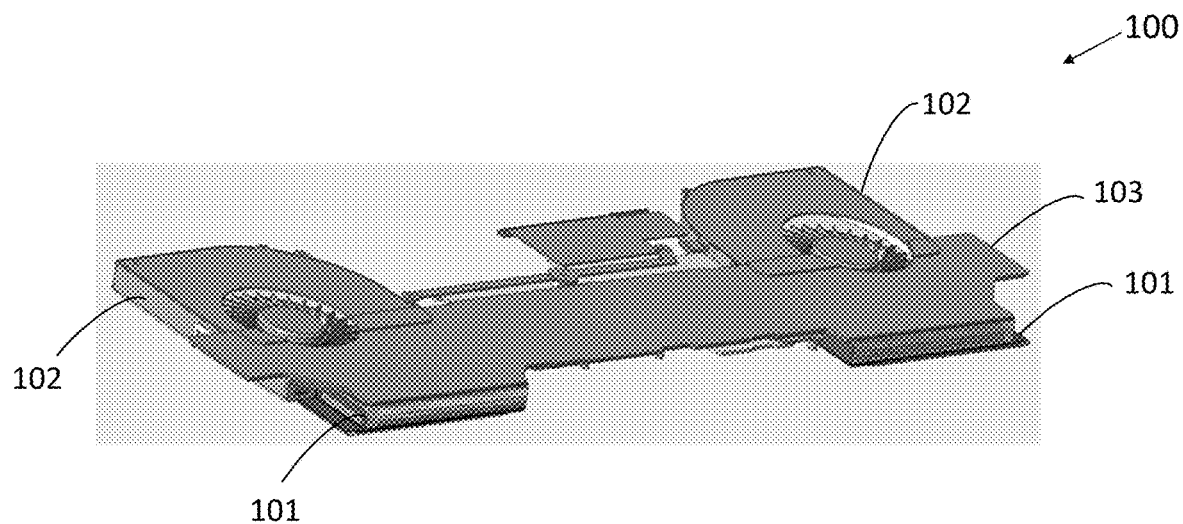
FIG. 1A shows a perspective view of an exemplary thermal unit for a laptop in a retracted or closed position according to the present disclosure.

The following detailed description refers to the accompanying drawings that show, by way of illustration, specific details and aspects in which the present disclosure may be practiced. These aspects are described in sufficient detail to enable those skilled in the art to practice the present disclosure. Various aspects are provided for devices, and various aspects are provided for methods. It will be understood that the basic properties of the devices also hold for the methods and vice versa. Other aspects may be utilized and structural, and logical changes may be made without departing from the scope of the present disclosure. The various aspects are not necessarily mutually exclusive, as some aspects can be combined with one or more other aspects to form new aspects.

The present disclosure is directed to improving the thermal performance and cooling of laptop computers given the limitations of a laptop's form factor. In particular, the various aspects provide for an expandable fan unit and an expandable heat exchanger that are combined with an expandable laptop chassis. In an aspect, the expandable laptop chassis may include a compartment with an upper portion and a lower portion, in which at least a segment of the lower portion of the compartment is releasable from the upper portion of the compartment, and when the lower portion of the compartment is released from the upper portion of the compartment, an opening may be produced therebetween.

In an aspect, the expandable heat exchanger may be provided with flexible thermal spreaders, e.g., a movable graphite fin section, that is at least partially "retractable" or collapsable when the upper and lower portions of the compartment are mated, and at least partially extendable when the lower portion of the compartment is released. In accordance with the present disclosure, a flexible thermal spreader may be made of graphite, a copper braiding, a flexible metal alloy or shape memory alloy with a high thermal conductivity, or other types of flexible materials having high thermal conductivity.

In another aspect, the expandable heat exchanger may be provided with a stationary first section and a movable second section, for which the second section is retractable into the first section when the upper and lower portions of the compartment are mated, and extendable from the first section, when the lower portion of the compartment is released. The second section may be "retracted" or collapsed by folding against the first section and by the movement of the portions attached to the first section, i.e., the graphite spreaders. The present expandable heat exchange may have first and second sections that may be "hybrid" fins (e.g., a combination of copper and a flexible thermal spreader, e.g., graphite heat spreaders) that expand to facilitate heat dissipation from the laptop.

In a further aspect, the present expandable heat exchanger may have a first section that may be stationary copper fins or heat spreaders, which are fixed, non-moving parts, and a moveable second section that may be flexible graphite fins or thermal spreaders, which are the expanding, moving parts. In this aspect, the present hybrid design provides "guides" for the graphite spreaders that enhance their reliability for repeated movement in the expandable system.

In another aspect, the expandable fan unit provides blown air that passes through the hybrid fins to further facilitate heat dissipation. In yet another aspect, as provided by the present disclosure, the present hybrid design may use a conventional copper heat sink (e.g., thermal heat tubes) found in laptops as a heat carrier that may be connected to the expandable heat exchanger as part of a complete thermal solution.

To more readily understand and put into practical effect the present thermal unit, particular aspects will now be described by way of drawings providing examples that are not intended as limitations. The advantages and features of the aspects herein disclosed will be apparent through reference to the following descriptions relating to the accompanying drawings. Furthermore, it is to be understood that the features of the various aspects described herein are not mutually exclusive and can exist in various combinations and permutations. For the sake of brevity, duplicate descriptions of features and properties may be omitted.

As shown in FIG. 1A, an exemplary thermal unit 100 may have an expandable heat exchanger 101, an expandable fan unit 102, and a heat sink 103 that may be used for a laptop (not shown), according to the present disclosure. In this aspect, there may be two expandable heat exchangers 101 and two expandable fan units 102 that are in a retracted or closed position. In the retracted position, the thermal unit 100 may not be needed or may be operating at a reduced efficiency if the heat generated by a laptop is not significant enough to affect performance.

Figure 1B:
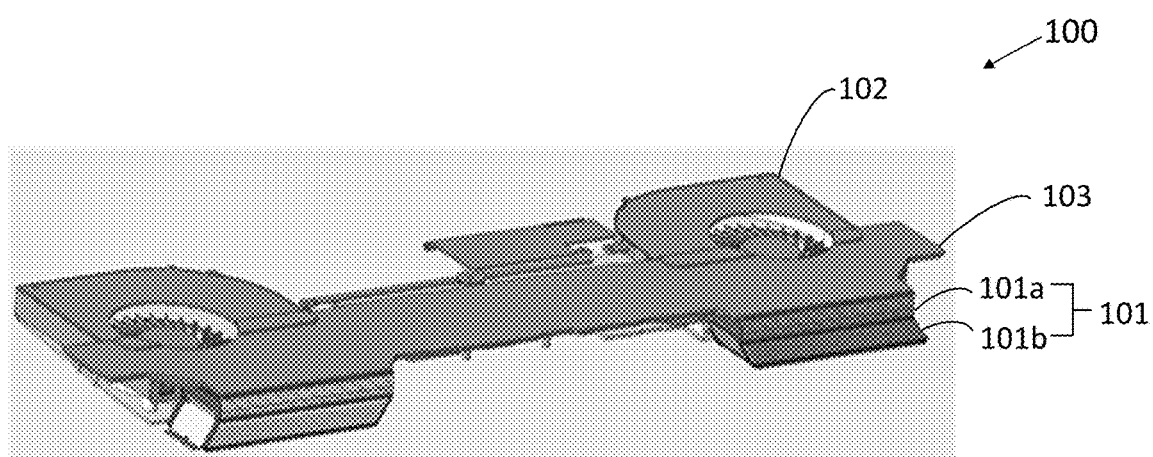
FIG. 1B shows a perspective view of an exemplary thermal unit for a laptop in an extended or opened position according to the present disclosure.

In FIG. 1B, the exemplary thermal unit 100 may have the expandable heat exchanger 101 in an extended or opened position according to the present disclosure. In an aspect, the expandable heat exchangers 101 may have a stationary or fixed first section 101a and a moveable or extendable second section 101b. The two expandable heat exchangers 101 may be in the extended or opened position together. In the expanded position, the thermal unit 100 may operate at a higher efficiency to remove the heat generated by the laptop.

Figure 2A:
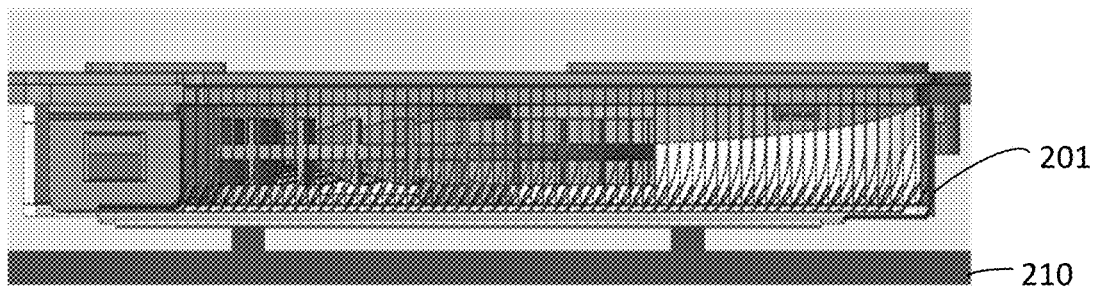
FIG. 2A shows a partial view of an exemplary expandable heat exchanger for a laptop in a retracted or closed position according to the present disclosure.

FIG. 2A shows a partial view of an exemplary expandable heat exchanger 201 in a retracted or closed position according to the present disclosure. In this aspect, a moveable segment 210 of a lower portion of a compartment for a laptop clamshell (not shown) may be positioned below the expandable heat exchanger 201. The moveable segment 210 may be releasable in conjunction or cooperatively with the expansion of the expandable heat exchanger 201. In some aspects, the moveable segment 210 may be abutting the expandable heat exchanger 201 as shown in FIG. 2A.

Figure 2B:
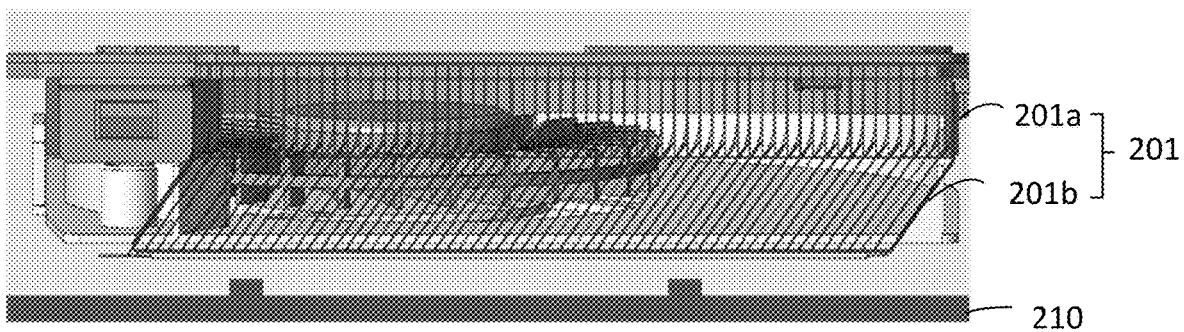
FIG. 2B shows a partial view of an exemplary expandable heat exchanger for a laptop in an extended or opened position according to the present disclosure.

In FIG. 2B, the expandable heat exchanger 201, as shown in FIG. 2A, may be configured in an extended or opened position according to the present disclosure. The expandable heat exchanger 201 may have a first section 201a, which is vertically positioned, and a second section 201b, which is diagonally positioned. In some aspects, the moveable segment 210 may be separated or spaced apart from the expandable heat exchanger 201 as shown in FIG. 2B and engaged only at an edge portion as shown in FIG. 8B below.

Figures 3, 3A:
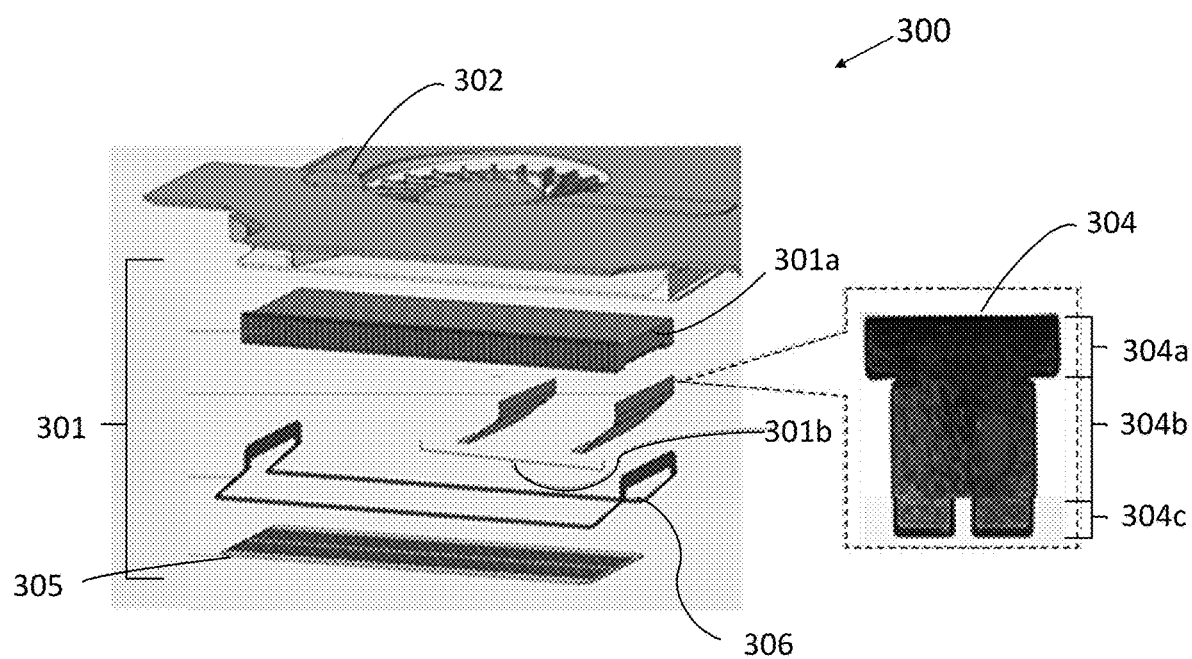
FIG. 3 shows a disassembled partial view of an exemplary expandable heat exchanger according to the present disclosure.
FIG. 3A shows an exemplary flexible thermal spreader according to the present disclosure.

FIG. 3 shows a partial view of an exemplary thermal unit 300 with an expandable heat exchanger 301, which is shown disassembled, and a fan unit 302 according to the present disclosure. The components of the expandable heat exchanger 301 include a first section 301a, which may be made of a slotted metal structure (shown and discuss further with FIG. 5 below), a moveable second section 301b, which may be made of a flexible thermal spreader, i.e., a plurality of flexible or bendable graphite sheets 304 (shown and discussed further with FIG. 3A below), a carrier 305 and a spring structure 306.

In an aspect, the carrier 305 may hold the plurality of graphite sheets 304 in place; for example, the graphite sheets 304 may be attached to the carrier 305 by insertion into parallel slots in the carrier and secured by an adhesive. The carrier 305 may be connected to the spring structure 306, which moves the carrier 305 from a retracted position to an expanded position.

In another aspect, the spring structure 306 may be made of any suitable material and take any form that provides a spring-back effect capable of expanding the expandable heat exchanger 310 from a retracted position to an expanded position and support the weight of a laptop to maintain a movable segment of a laptop chassis in an open position. The spring structure may be made of sheet metal or metal rod, e.g., a shape memory alloy or muscle wire, that is formed into a "spring-arm", as shown in FIG. 3, or a mechanical device, such as a hydraulic gas spring, linear actuator or other motorized drive mechanisms.

According to the present disclosure, an exemplary flexible graphite sheet 304 is shown in FIG. 3A, and the two graphite sheets 304 shown in FIG. 3 are merely representative of the plurality of flexible graphite sheets that may form the moveable second section 301b of the expandable heat exchanger 301. The flexible graphite sheet 304 may include portions 304a, 304b, and 304c, which may have a specific functionality. For example, the portion 304a may be positioned in a slot of first section 301a, the portion 304b is a body that is primarily used for the dissipation of heat, and the portion 304c may be attached to a carrier 305. A flexible graphite sheet may have dimensions in the range of approximately 5 mm to 50 mm in width and approximately 3 mm to 30 mm in length.

Figure 4:
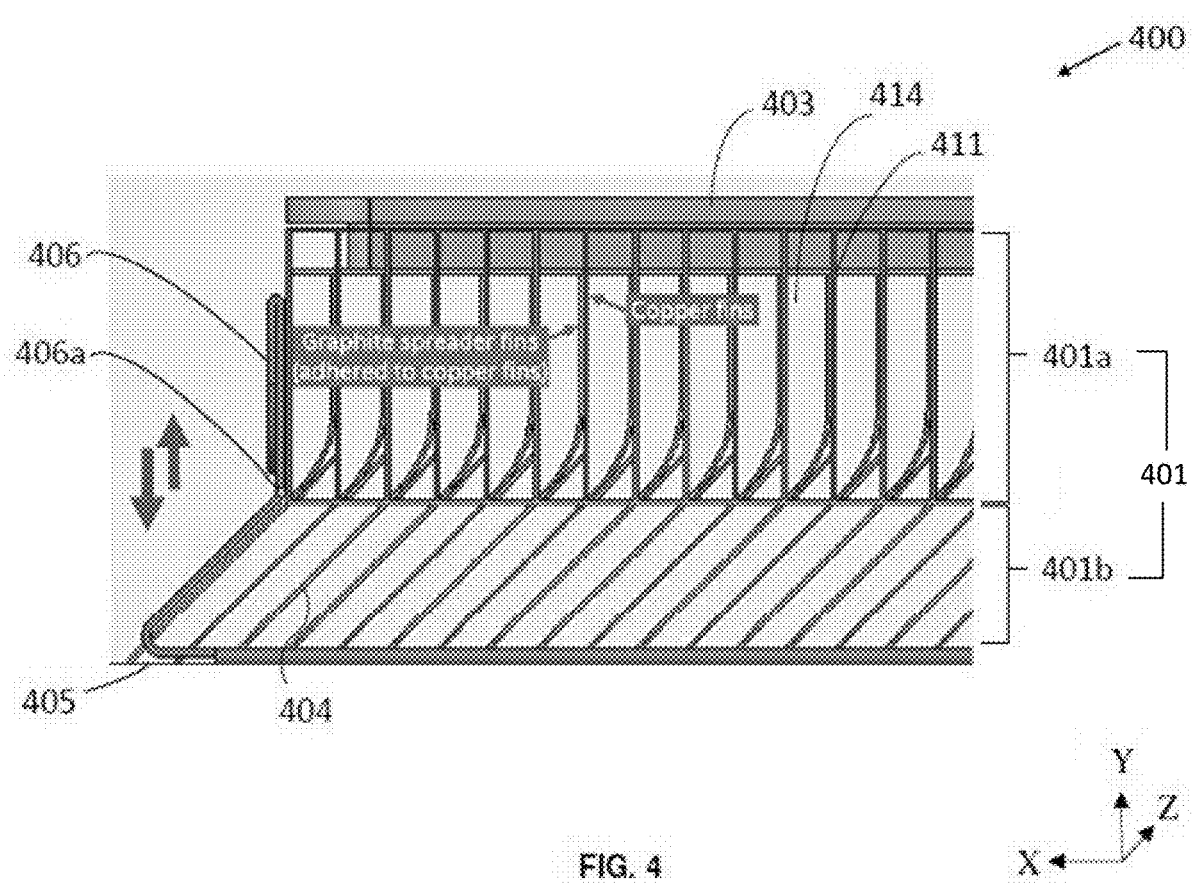
FIG. 4 shows a partial view of an exemplary expandable heat exchanger in an extended or opened position according to the present disclosure.

FIG. 4 shows a partial view of an exemplary expandable heat exchanger 400 in an extended or opened position according to the present disclosure. In this aspect, the expandable heat exchanger may be a hybrid combination of copper and flexible thermal spreaders, which may be made of graphite. A first section 401a of the expandable heat exchanger 401 may include a plurality of fixed copper fins 411 that form a plurality of slots 414. A second section 401b of the expandable heat exchanger 401 may include a plurality of graphite spreaders 404 that are attached to a carrier 405. A spring structure 406 may be attached to the first section 401a at an end portion thereof and the carrier 405 along a side portion thereof. In an aspect, in moving to a retracted position, the carrier 405 and the attached graphite spreaders may move in a generally vertical direction, i.e., along a y-axis, caused by the spring structure 406 moving about a pivot mechanism 406a.

In another aspect, the second section 401b may retract into section 401a with an application of an upward force on the carrier 405 and the graphite spreaders 404 moving toward the copper fins 411. The second section 401b may be in a fully retracted position when the graphite spreaders 404 reach an approximately horizontal position and are in overlying contact. A restraining mechanism (not shown) may be used to keep the movable segment of the compartment (not shown) and the second section 401b in a retracted position. In a further aspect, each graphite spreader 404 may be permitted to shift in its slot 414 as the section 401b of the expandable heat exchanger 401 retracts and expands.

Figure 5:
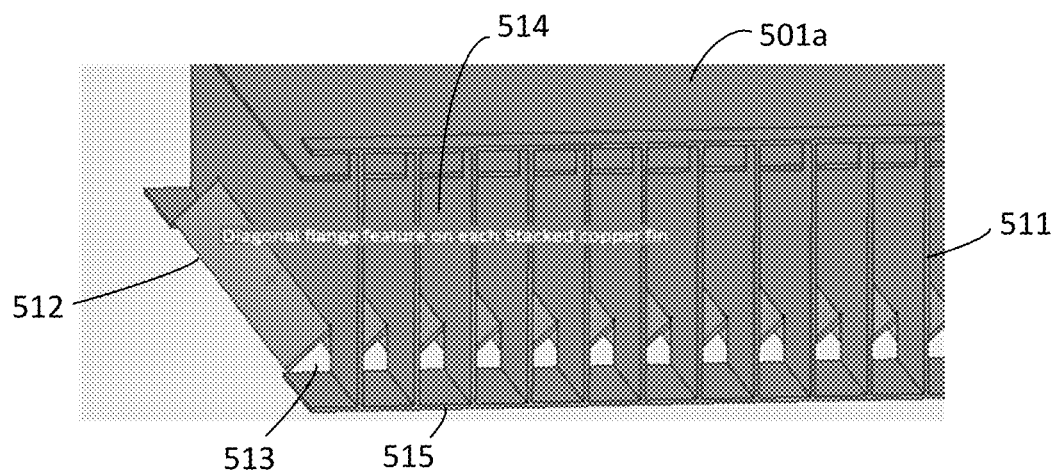
FIG. 5 shows a perspective partial view of a plurality of guides in a first section of an exemplary expandable heat exchanger according to the present disclosure.

In FIG. 5, a perspective partial view of an exemplary expandable heat exchanger shows a plurality of guide features 512 as an aspect of a first section 501a in the present disclosure. These guide features may be diagonal flanges 512 that are positioned at the bottom of vertical fins 511, which are joined to two bottom base plates 515. The diagonal flanges 512 are designed to provide a sufficiently gentle bending radius for the graphite spreaders 504 to permit reliable and repeatable movement from a retracted to an expanded position and prevent sharp bends.

Also shown in FIG. 5 are openings 513 that may be proximal to the diagonal flanges 512. The openings 513 may be passageways to slots 514 of the first section 501a. The openings 513 may be used to insertably position graphite spreaders 504 into slots 514.

Figures 5A, 5B:
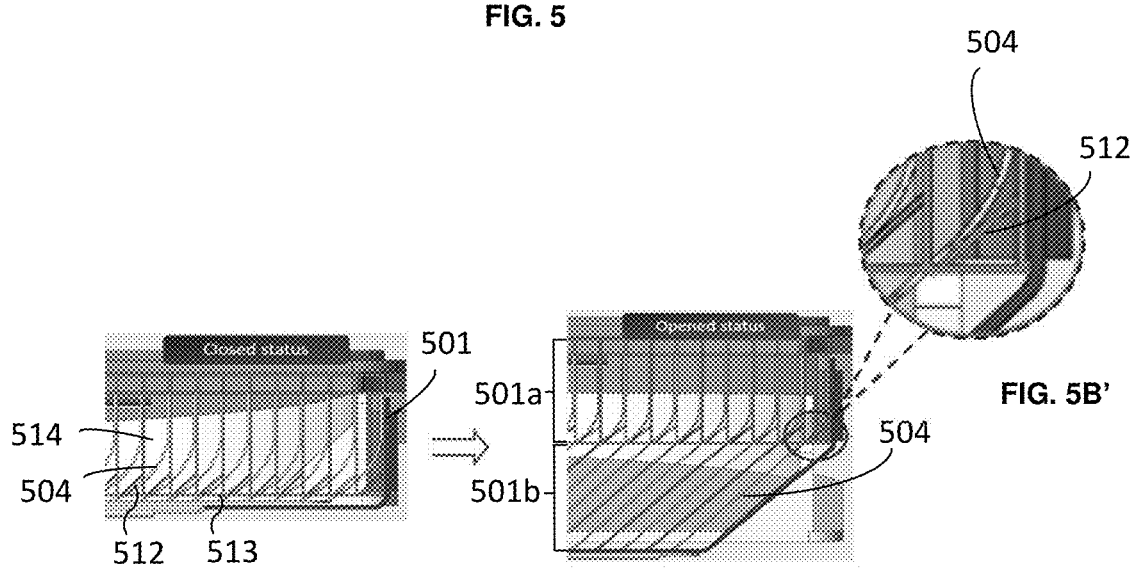
FIGS. 5A and 5B show partial views of an exemplary expandable heat exchanger for a laptop in retracted and extended positions, respectively, and FIG. 5B' is an expanded view of a portion of the expandable heat exchanger according to the present disclosure.

According to the present disclosure, FIGS. 5A and 5B show partial views of an exemplary expandable heat exchanger 501 for a laptop in retracted and extended positions, respectively, and FIG. 5B' shows an expanded view of a portion of the expandable heat exchanger in FIG. 5B. In FIG. 5A, a moving portion of the graphite spreader 504 may be guided by a bottom surface of a diagonal flange 512 as it passes through opening 513 to enter slot 514 of the expandable heat exchanger 501. In FIG. 5B, the expandable heat exchanger 501 may be in an expanded modality with a second section 501b extended from a first section 501a and graphite spreaders 504 in a diagonal orientation. As shown in FIG. 5B', the moving portion of the graphite spreader 504 may shift in the opening 513 and be guided by a top surface of an adjacent diagonal flange 512.

Figure 6:
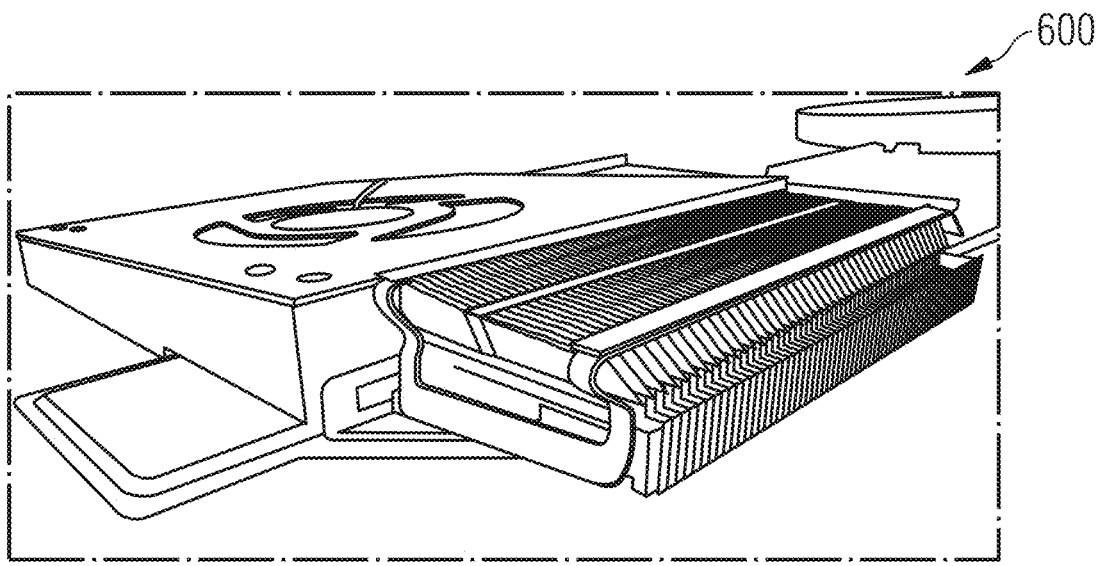
FIG. 6 shows a photograph of a bottom view of an exemplary expandable heat exchanger for a laptop in an extended or opened position according to the present disclosure.

FIG. 6 shows a photograph of a bottom view of thermal unit 600 with an expandable heat exchanger for a laptop in an extended or opened position according to the present disclosure.

Figure 7:
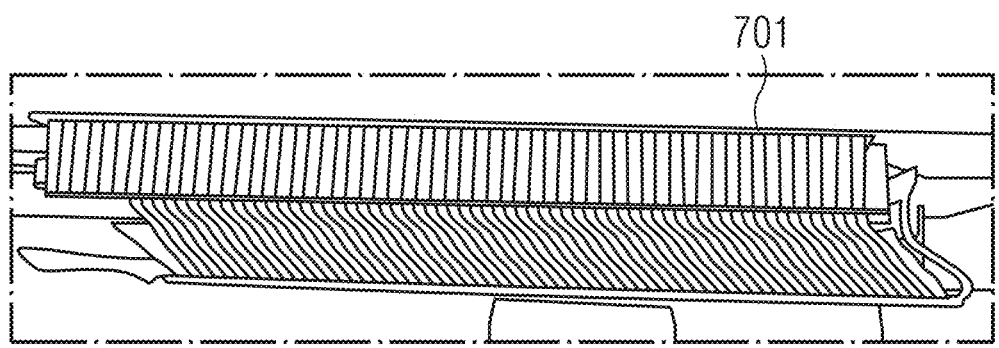
FIG. 7 shows a photograph of a frontal view of an exemplary expandable heat exchanger for a laptop in an extended or opened position according to the present disclosure.

FIG. 7 shows a photograph of a frontal view of an exemplary expandable heat exchanger 701 for a laptop in an extended or opened position according to the present disclosure.

Figure 8A:
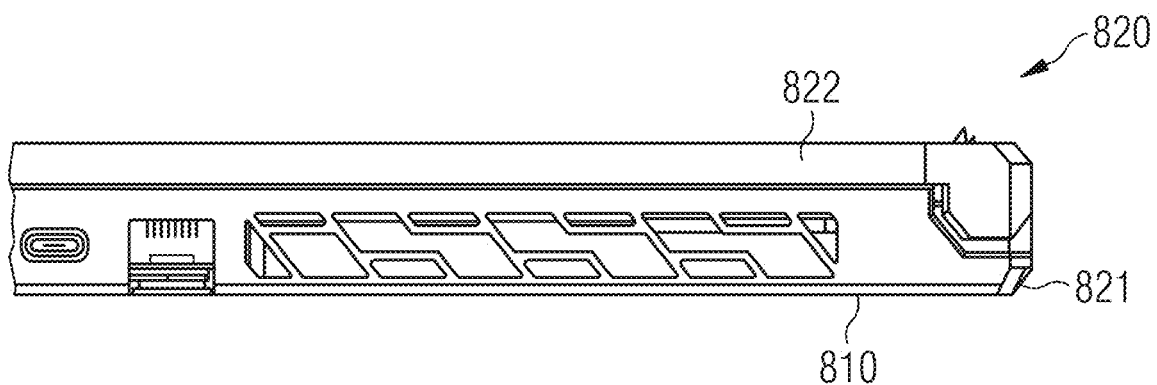
FIG. 8A shows a side view of an exemplary clamshell for a laptop with an expandable heat exchanger in a retracted position and FIG. 8A' show side views of exemplary components within a compartment of a clamshell for a laptop according to an aspect of the present disclosure.
Figure 8A:
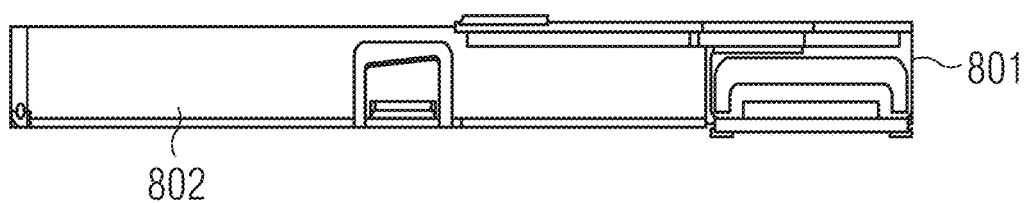
Figure 8B:
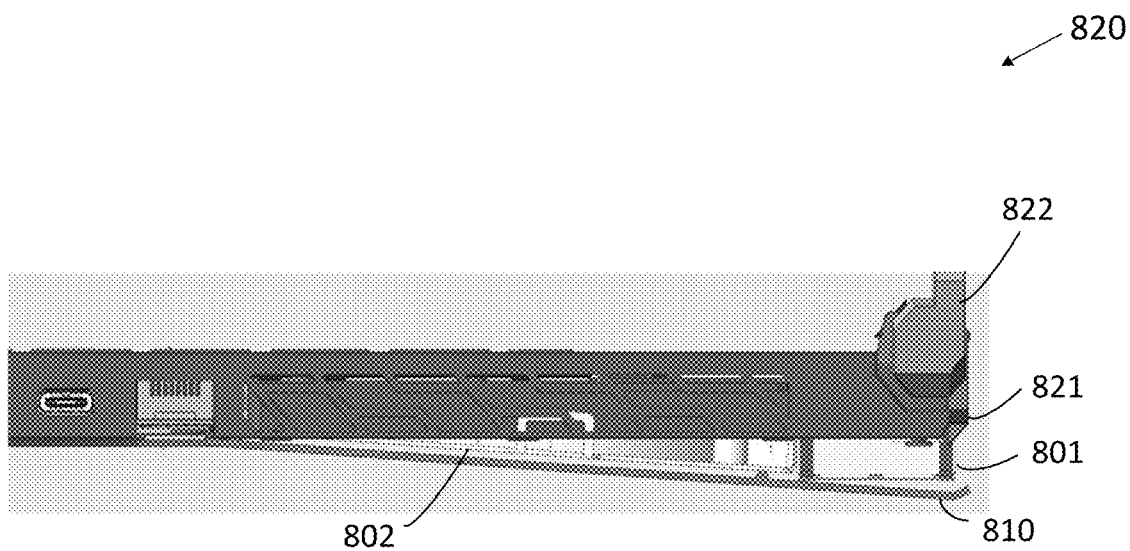
FIG. 8B shows a side view of the exemplary clamshell for the laptop shown in FIG. 8A in an opened position and the expandable heat exchanger in an extended position according to an aspect of the present disclosure, and FIG. 8B' show side views of exemplary components within the compartment of the clamshell for the laptop in an extended position according to an aspect of the present disclosure.
Figure 8B:
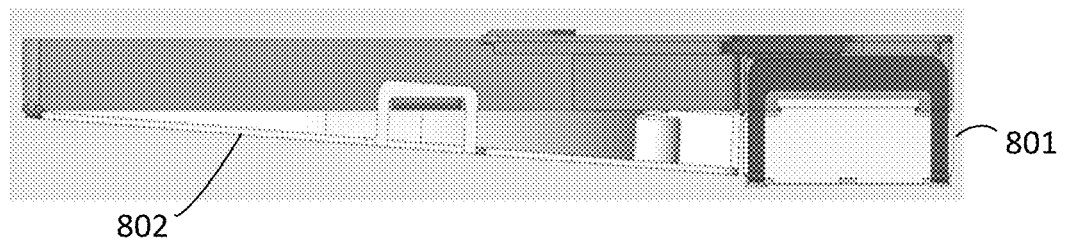

FIG. 8A shows a side view of an exemplary clamshell for a laptop 820 including a compartment 821 with moveable movable segment 810, and a screen 822, and FIG. 8A' shows side views of exemplary components within the compartment 821 according to an aspect of the present disclosure. In FIG. 8A', within compartment 821, an expandable heat exchanger 801 and an expandable fan unit 802 are shown in retracted positions, respectively.

FIG. 8B shows a side view of the exemplary clamshell for the laptop 820, as shown in FIG. 8A, with moveable lower segment 810 in an opened position and the expandable heat exchanger 801 and expandable fan unit 802 in an extended position according to an aspect of the present disclosure. In some aspects, the moveable lower segment 810 may be separated or spaced apart from the expandable heat exchanger 801 and engaged only at an edge portion thereof as shown in FIG. 8B.

FIG. 8B' shows side views of exemplary components within the compartment 821 according to an aspect of the present disclosure. In FIG. 8B', within compartment 821, an expandable heat exchanger 801 and an expandable fan unit 802 may be released into extended positions, respectively. In the lowered expanded position, the expandable fan unit 802 may move air through the expandable heat exchanger 801 at both the stationary first section and the moveable second section, which would not be possible with conventional fan units.

Figure 9:
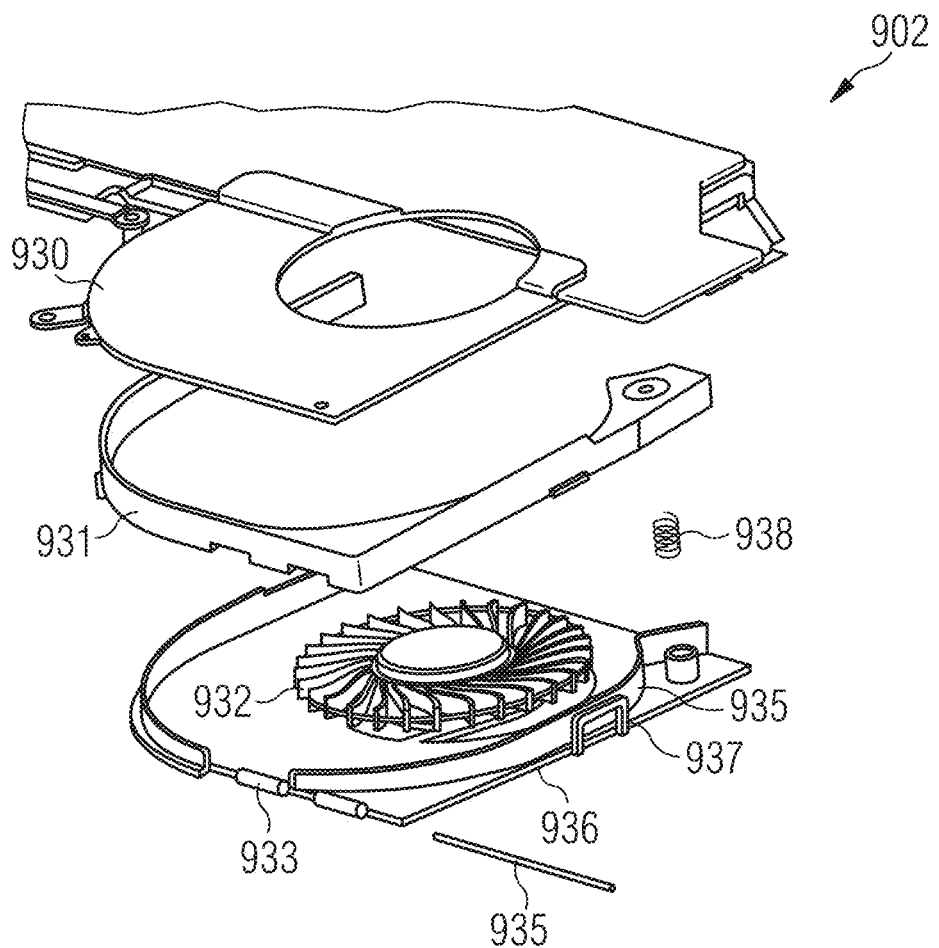
FIG. 9 shows a disassembled perspective view of an exemplary fan unit according to an aspect of the present disclosure.

FIG. 9 shows a disassembled perspective view of an exemplary expandable fan unit 902 according to an aspect of the present disclosure. Unlike conventional stationary laptop fans, the present expandable fan unit may have a fan top cover 930, a fan frame 931, a fan 932, and a fan base 936 that are normally present, and additionally, a hinge 933 with hinge pin 934, a fan volute wall 935, a mechanical stop feature 937 and fan spring 938 provide the present capabilities. The fan volute wall 935 and base cover keep the fan volute profile continuous in the expanded modality. The fan spring 938 may provide the force needed for the expansion of the fan unit 902. As essential features of the expandable fan unit, the hinge 933 and hinge pin 934 form the axis of rotation, and the mechanical stop feature 937 provides a limiter to the expansion of the fan unit 902

Figure 10A:
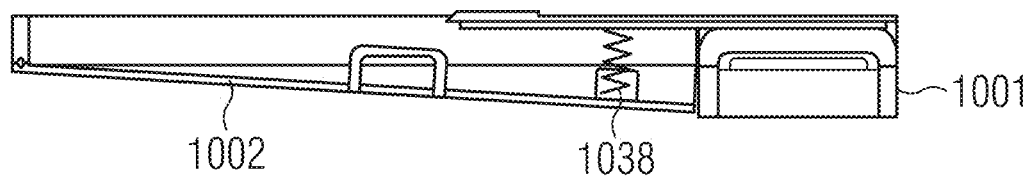
FIGS. 10A and 10B show side views of exemplary components within a compartment of a clamshell for a laptop in extended positions according to an aspect of the present disclosure.
Figure 10B:
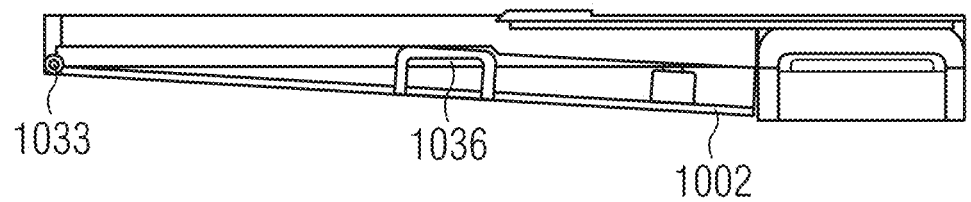

FIGS. 10A and 10B show side views of exemplary components within a compartment of a clamshell for a laptop, i.e., an expandable heat exchanger 1001 and an expandable fan unit 1002 in extended positions according to an aspect of the present disclosure. In FIG. 10A, a spring member 1038 may be placed at a cutwater area behind a fan volute wall (not shown) and a fan hinge 1033 provides an axis of rotation for expansion. In FIG. 10B, a mechanical stop feature 1036 for maximum open angle control is shown. Typically, the cutwater area belongs to the outer zone of the flow channel, which could be utilized for other usages without affecting the fan unit's performance.

Figure 10C:
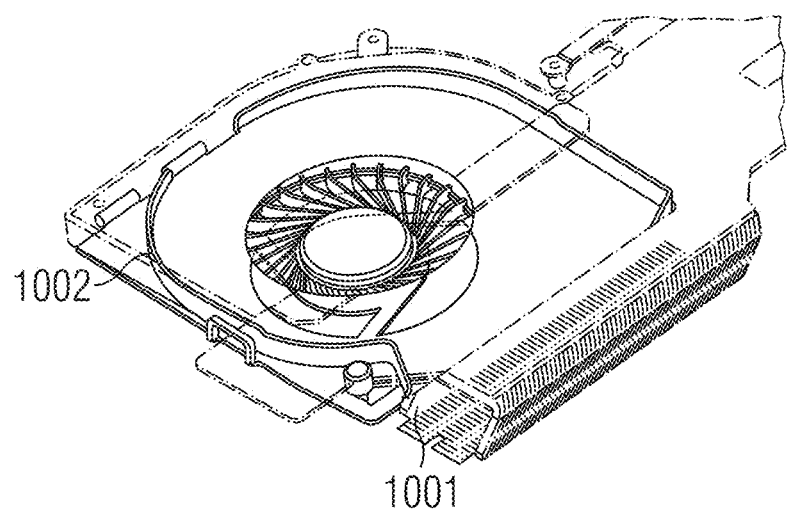
FIG. 10C shows a perspective top view of an exposed portion of an expandable fan unit that separates from a cover according to an aspect of the present disclosure.

In addition, FIG. 10C shows a perspective top view of an expandable fan unit 1002 that is exposed, i.e., without a fan cover, and an expandable heat exchanger 1001 according to an aspect of the present disclosure.

Figure 11:
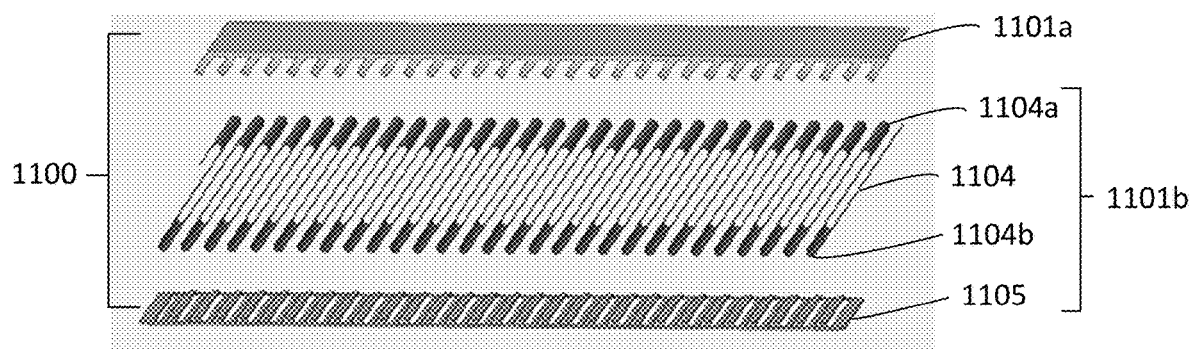
FIG. 11 shows a disassembled perspective view of an exemplary movable section of an expandable heat exchanger according to an aspect of the present disclosure.

FIG. 11 shows a disassembled perspective view of an exemplary expandable heat exchanger 1100 with a stationary section 1101a and movable section 1101b according to an aspect of the present disclosure. The movable section 1101b may have a flexible thermal spreader 1104, and a base plate 1105 with a plurality of slats, i.e., a slatted base plate. The flexible thermal spreader 1104 may be an oblong flexible thermal spreader (e.g., a graphite sheet) with down folds 1104a and up folds 1104b therein. The down folds 1104a and up folds 1104b may be pre-formed prior to assembly and the up folds 1104b of the flexible thermal spreader 1104 may be horizontally slid onto the slats of the base plate 1105, or the folds may be formed after flexible thermal spreader 1104 is inserted into the slatted base plate 1105 as discussed in FIG. 12 below. A spring mechanism (not shown) may be used to extend the movable section 1101b.

Figure 12:
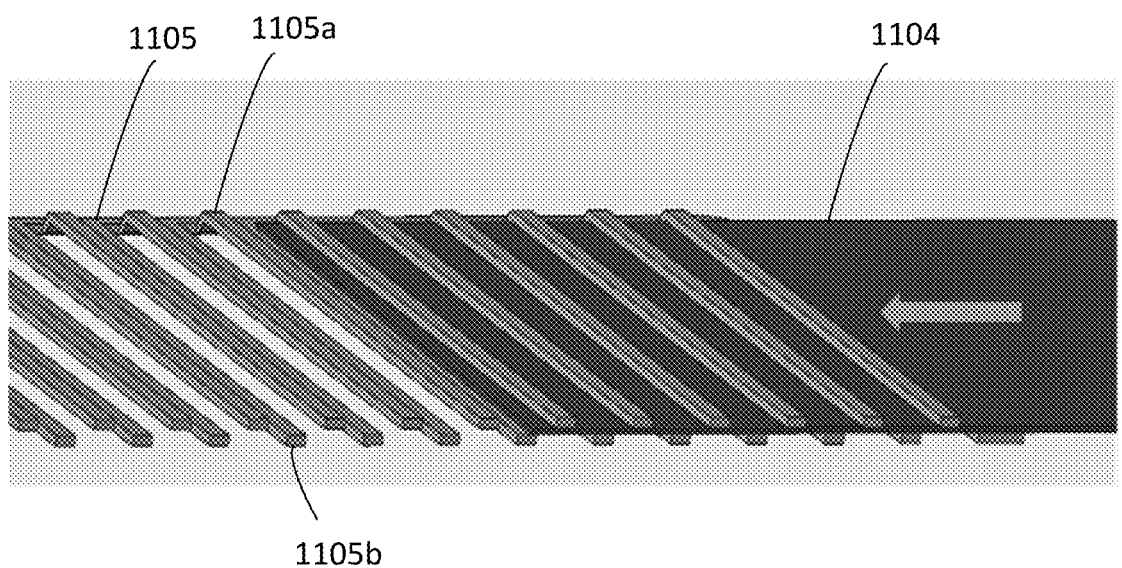
FIG. 12 shows a perspective view of an exemplary slatted base plate and an oblong sheet of a movable section of an expandable heat exchanger according to an aspect of the present disclosure.

In FIG. 12, the movable section 1101a may be assembled have the flexible thermal spreader 1104 provided as a flat oblong sheet, according to an aspect of the present disclosure, that may be inserted between upper slats 1105a and lower slats 1105b of the slatted base plate 1105. The upper slats 1105a and lower slats 1105b hold the flexible thermal spreader 1104 in place, while the up and down folds 1104a and b (not shown) may be formed by mechanically pulling the oblong sheet upward and around the slats 1105a. The flexible thermal spreader 1104 may be made of graphite, a copper braiding, a flexible metal alloy or shape memory alloy with a high thermal conductivity, or other types of flexible materials having high thermal conductivity.

Figure 13:
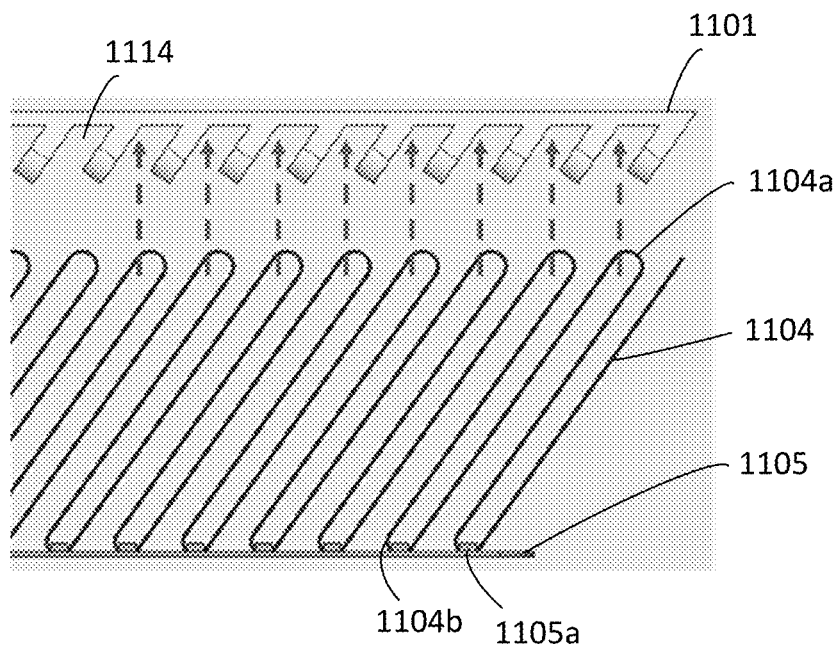
FIG. 13 shows a cross-section view of an exemplary folded oblong sheet in position to engage a plurality of slot spaces of a stationary section according to an aspect of the present disclosure.
Figure 14:
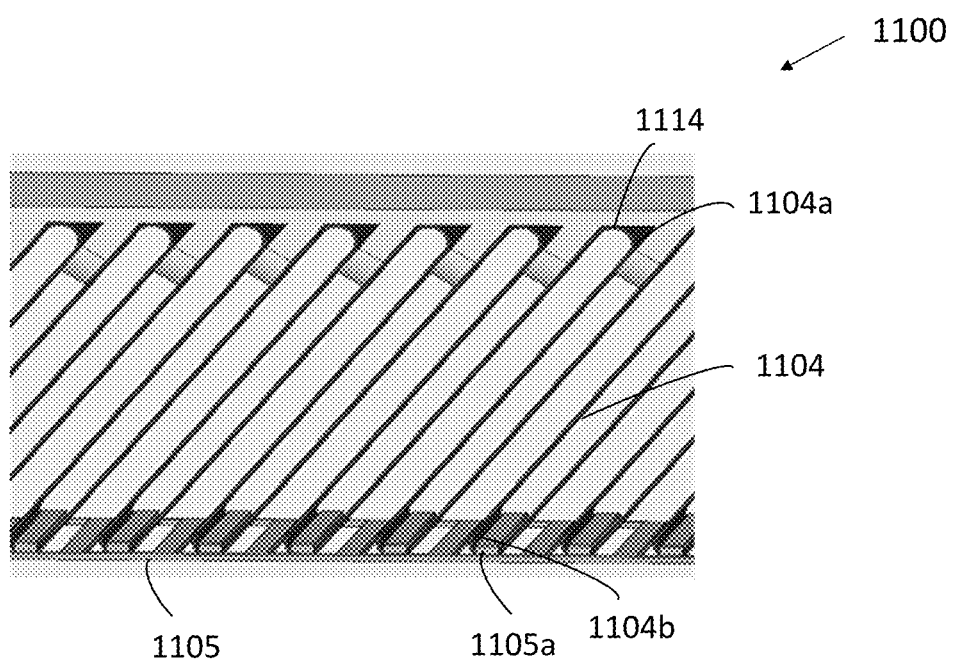
FIG. 14 shows a partial perspective view of an exemplary top folds of an oblong sheet engaged with a plurality of slot spaces of a stationary section according to an aspect of the present disclosure.

In an aspect shown in FIG. 13, an exemplary folded oblong sheet 1104 may have its up folds placed on slats 1105b of a slatted base plate 1105 and its down folds aligned to engage a plurality of slot spaces 1114 of a stationary section 1101. In FIG. 14, a partial perspective section view an assembled movable section 1100 shows the top folds 1104a of the flexible heat spreader 1104 positioned in the slot spaces 1114, which may be held in place using a thermally conductive glue or adhesive, or by soldering. The stationary section 1101 may act as a stationary attachment member for the flexible thermal spreader 1104.

Figure 15:
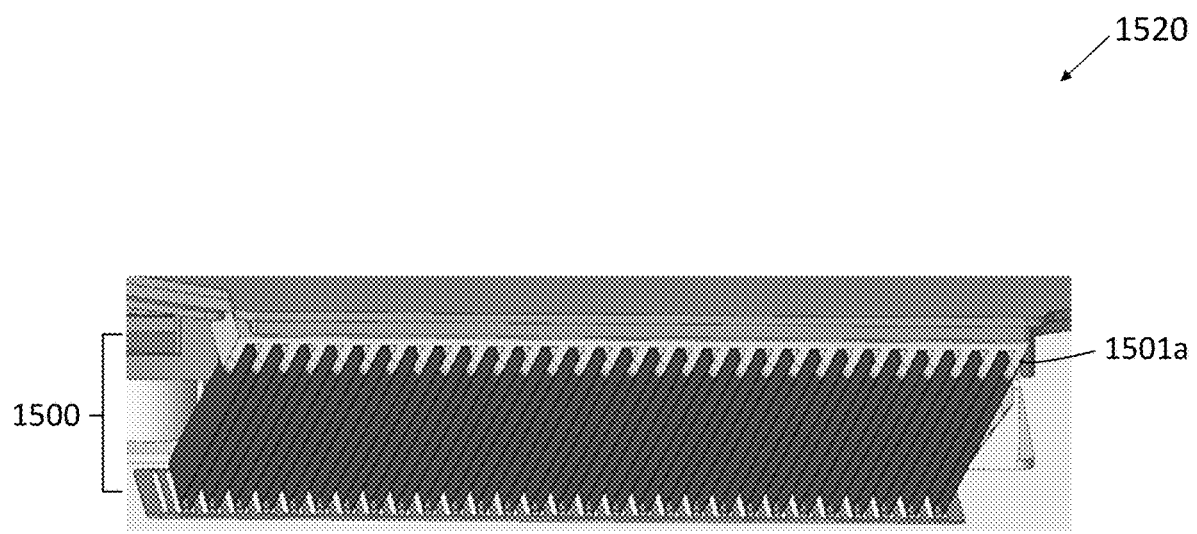
FIG. 15 shows a perspective view of an assembled exemplary movable section of an expandable heat exchanger according to an aspect of the present disclosure.

According to an aspect of the present disclosure, FIG. 15 shows a perspective view of a laptop 1520 with a fully assembled expandable heat exchanger 1500. It is within the scope of the present disclosure for a stationary section 1501a to be attached to a heat sink, e.g., heat transfer tubes, or heat spreader fins (e.g., a copper structure similar to 501a above) used in a typical laptop computer. For a typical laptop, a pair of the expandable heat exchanger 1500 may be used in the laptop. As shown in FIG. 15, the expandable heat exchanger 1500 may be in an extended position for providing cooling for the laptop. A spring mechanism (not shown) may be used to extend the expandable heat exchanger 1500.

Figure 16:
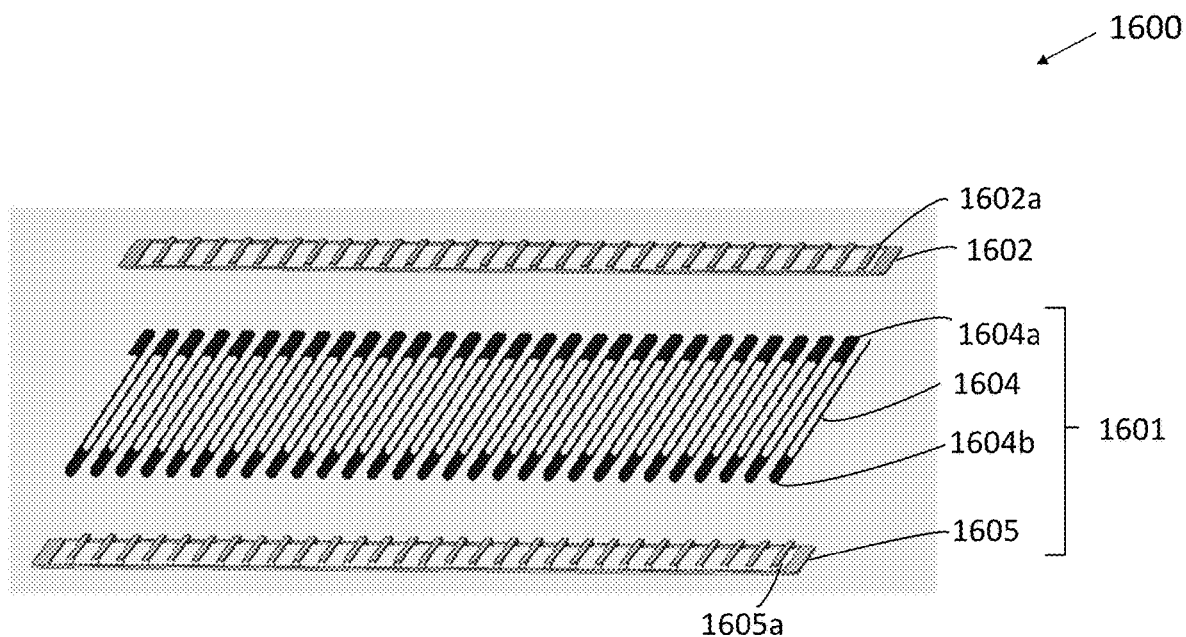
FIG. 16 shows a disassembled perspective view of an exemplary movable section of an expandable heat exchanger according to another aspect of the present disclosure.

FIG. 16 shows a disassembled perspective view of an expandable heat exchanger 1600 with an exemplary movable section 1601 according to an aspect of the present disclosure. The expandable heat exchanger 1600 may have a slatted top plate 1602, a flexible thermal spreader 1604, and a base plate 1605 with a plurality of slats, i.e., a slatted base plate. The flexible thermal spreader 1604 may be an oblong flexible thermal spreader (e.g., a graphite sheet) with down folds 1604a and up folds 1604b therein. The slats 1602a of the slatted top plate 1602 may be flat or elevated from the frame of the slatted top plate 1602. The slats 1605a of the slatted base plate 1605 may be elevated from the frame of the slatted base plate 1605. The down folds 1604a and up folds 1604b may be pre-formed prior to assembly and the down folds 1604b of the flexible thermal spreader 1604 may be horizontally slid onto slats 1602a of the slatted top plate 1602 and the up folds 1604b of the flexible thermal spreader 1604 may be horizontally slid onto the slats 1605a of the slatted base plate 1605. The slatted top plate 1602 may act as a stationary attachment member for the flexible thermal spreader 1604.

Figures 17, 17A:
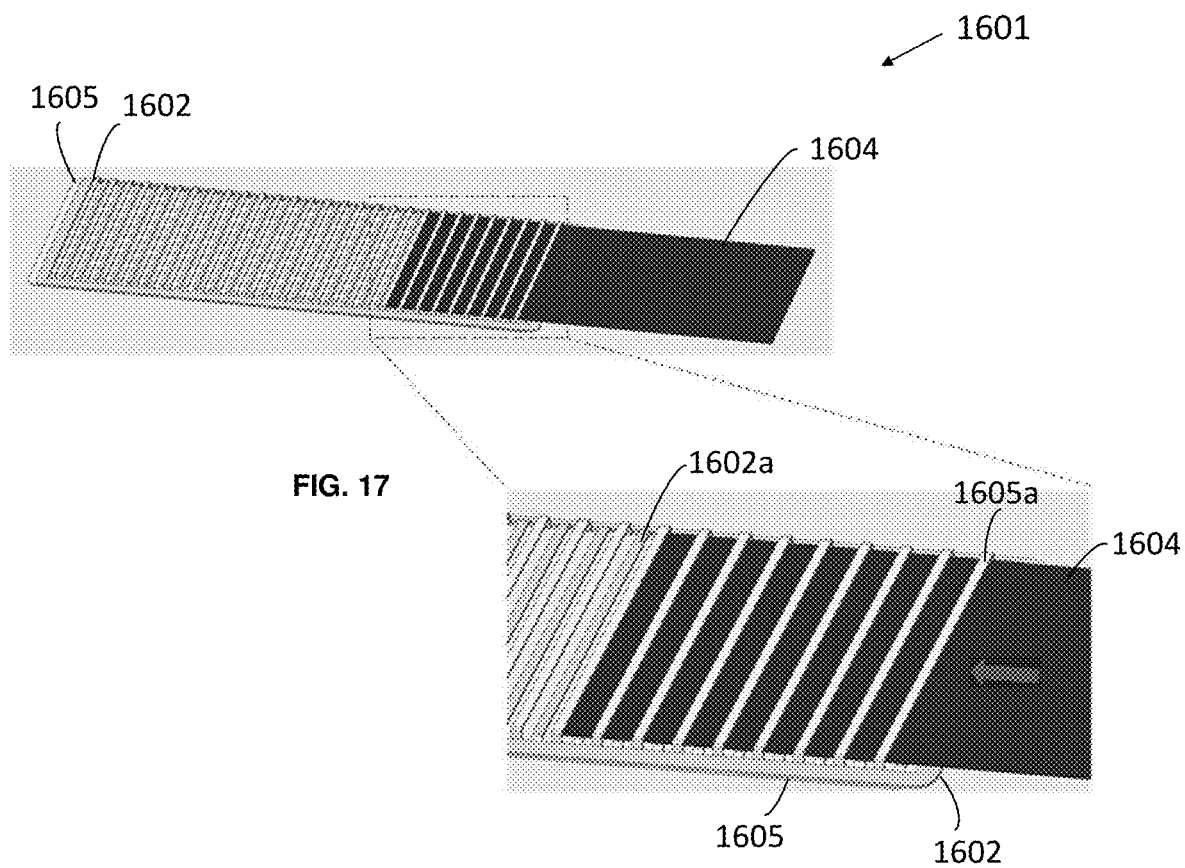
FIGS. 17 and 17A show perspective views of exemplary slatted top and base plates and an oblong sheet of a movable section of an expandable heat exchanger according to another aspect of the present disclosure.

FIGS. 17 and 17A show the movable section 1601 being assembled with the flexible thermal spreader 1604 provided as a flat oblong sheet, according to an aspect of the present disclosure, that may be inserted between slats 1602a of a slatted top plate 1602 and slats 1605a of a slatted base plate 1605. The slatted top plate 1602 and slatted base plate 1605 may be positioned in an overlapping manner during the assembly. The slats 1602a and slats 1605a hold the flexible thermal spreader 1604 in place, while the up and down folds 1604a and b (not shown) of the flexible thermal spreader 1604 may be formed by mechanically separating the slatted top plate 1602 from the slatted base plate 1605.

Figure 18:
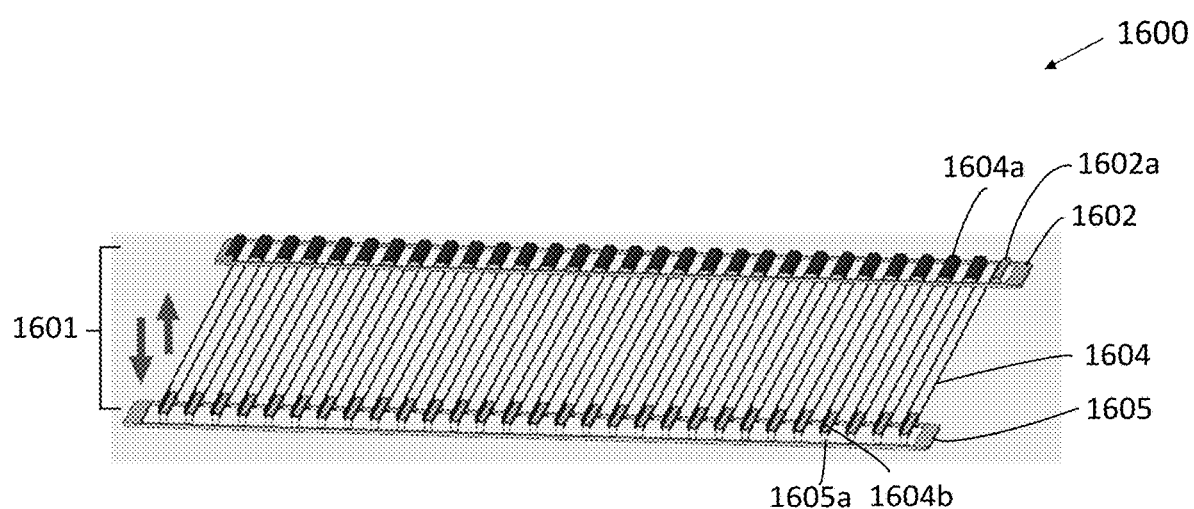
FIG. 18 shows a perspective view of an assembled exemplary movable section of an expandable heat exchanger according to another aspect of the present disclosure.

FIG. 18 shows a perspective view of the assembled exemplary movable section 1601 of an expandable heat exchanger 1600 according to another aspect of the present disclosure. The slatted top plate 1602 is shown separated from the slatted base plate 1605. The flexible thermal spreader 1604 may be between the slatted top plate 1602 from the slatted base plate. The up folds 1604b may be positioned on the slats 1605a and down folds 1604a may be positioned on the slats 1602a. As shown in FIG. 18, the movable section 1601 may be in an extended position for providing cooling for a laptop.

Figures 19, 19A:
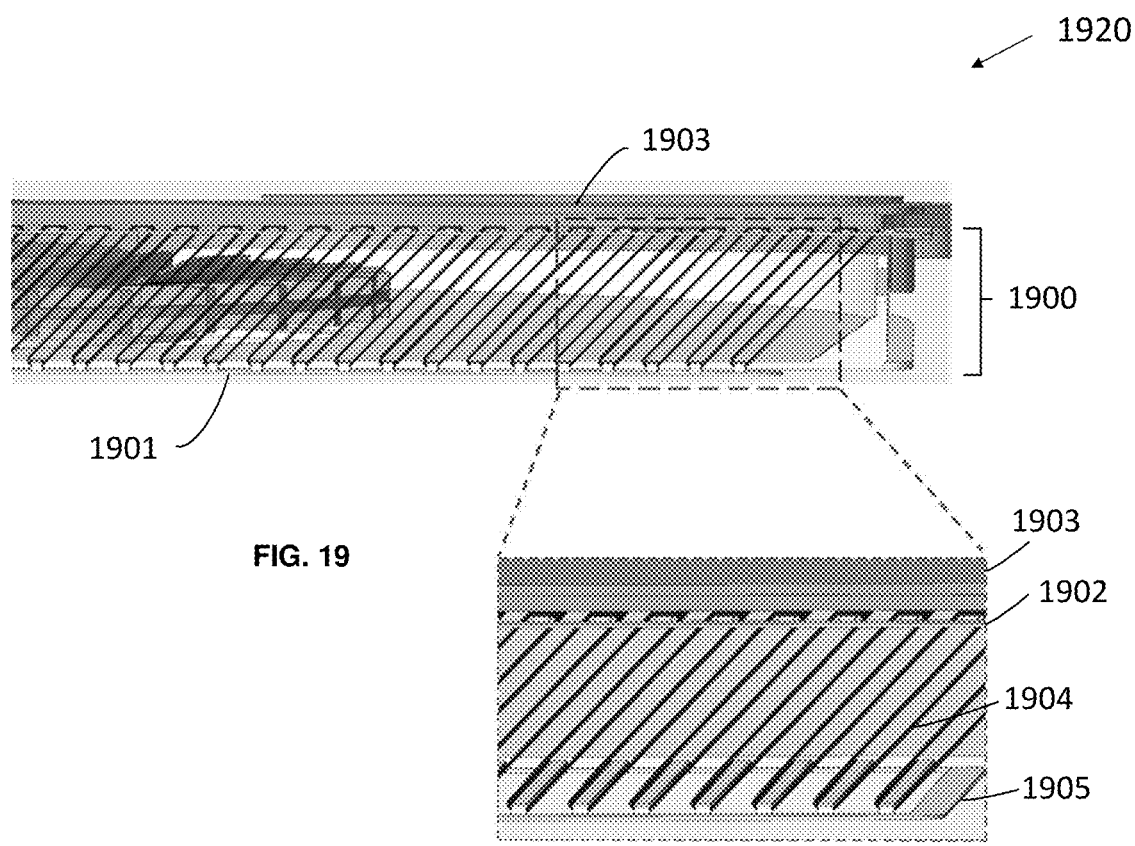
FIGS. 19 and 19A show an exemplary expandable heat exchanger positioned in a laptop according to yet another aspect of the present disclosure.

FIGS. 19 and 19A show an exemplary expandable heat exchanger 1900 positioned in a laptop 1920 according to yet another aspect of the present disclosure. A movable section 1901 may include a slatted top plate 1902, a slatted base plate 1905, and a flexible heat spreader position 1904 may be held therebetween. The expandable heat exchanger 1900 may be attached to a heat sink 1903 and the movable section 1901 may be in an extended position to provide improved cooling for the laptop 1920. A spring mechanism (not shown) may be used to extend the movable section 1901.

The expandable heat exchangers of the present disclosure may be fully compatible with other existing laptop expansion mechanisms, regardless of whether an expansion or elevation is driven by a laptop hinge or the bottom edge movement of a lower cover. The present expandable heat exchanger and expandable fan unit may be mainly linked and compressed by a movable segment of a bottom cover of a laptop. When the movable segment of the bottom cover moves away for the expansion of the thermal unit, a spring mechanism on the expandable fan unit and the expandable hybrid heat exchanger will release, thereby opening both units and providing additional space for the present thermal solution to deliver improved system performance.

According to the present disclosure, the aspects of the present thermal unit were analyzed using a simulated laptop with an eight-core CPU, e.g., Intel's Tiger Lake-H based reference laptop system) to compare the skin temperatures at specific monitoring points on a top surface of a compartment of a clamshell (i.e., the keyboard and surrounding surfaces) in a non-expanded/retracted modality versus an expanded modality. The graphite spreaders were expanded by 6 mm, which resulted in die/skin temperature improvement of a reduction of 3° C.-8° C. at the specific monitoring points.

To more readily understand and put into practical effect the present method and device for, particular aspects will now be described by way of examples. For the sake of brevity, duplicate descriptions of features and properties may be omitted.

EXAMPLES

Example 1 provides a computing device or laptop including a compartment with an upper portion and a lower portion, wherein the lower portion of the compartment is releasably mateable to the upper portion of the compartment, for which releasing the lower portion of the compartment from the upper portion of the compartment produces an opening therebetween, and an expandable heat exchanger with a movable section positioned in the compartment, for which the movable section retracts when the upper and lower portions of the compartment are mated and extends downward when the lower portion of the compartment is released, and the movable section of the expandable heat exchanger includes graphite heat spreaders.

Example 2 may include the device of example 1 and/or any other example disclosed herein, for which the expandable heat exchanger further includes a stationary section attached to the movable section, in which the graphite heat spreaders of the movable section retract to the stationary section when the upper and lower portions of the compartment are mated and extend from the stationary section when the lower portion of the compartment is released.

Example 3 may include the device of example 1 and/or any other example disclosed herein, including a fan unit with an upper cover and movable lower support, wherein the lower support moves downward when the lower portion of the compartment is released.

Example 4 may include the device of example 1 and/or any other example disclosed herein, including a spring mechanism assisting the release of the lower portion of the compartment from the upper portion of the compartment.

Example 5 may include the device of example 1 and/or any other example disclosed herein, in which the graphite heat spreaders further includes a plurality of flexible sheets or an oblong sheet with overlapping folds.

Example 6 may include the device of example 1 and/or any other example disclosed herein, in which the computing device is a clamshell laptop computer and the compartment is a bottom portion of a clamshell and the opening is located at a back section of the compartment.

Example 7 may include the device of example 6 and/or any other example disclosed herein, in which the clamshell laptop computer further comprises a laptop screen pivotably covering the compartment, for which lifting of the laptop screen releases the lower portion of the compartment.

Example 8 provides a thermal system for a computing device including an expandable heat exchanger with a movable section, wherein the movable section comprises graphite heat spreaders that extend from and retract to a stationary attachment member.

Example 9 may include the thermal system of example 8 and/or any other example disclosed herein, in which the graphite heat spreaders comprise a plurality of flexible sheets with top and bottom portions or an oblong sheet with a plurality of up and down folds.

Example 10 may include the thermal system of example 9 and/or any other example disclosed herein, in which the stationary attachment member further comprises a stationary section with a plurality of vertical copper sheets that form a plurality of slot spaces.

Example 11 may include the thermal system of example 10 and/or any other example disclosed herein, in which the expandable heat exchanger further includes the top portion of each of the plurality of flexible sheets being positioned in corresponding slot spaces of the stationary section; and in which each of the plurality of slot spaces further includes a guide for the flexible sheet positioned in the slot space.

Example 12 may include the thermal system of example 11 and/or any other example disclosed herein, in which the expandable heat exchanger further comprises a slotted base plate attached to the bottom portion of the plurality of flexible sheets.

Example 13 may include the thermal system of example 9 and/or any other example disclosed herein, in which the stationary section further includes a plurality of diagonal skived copper fins that form the plurality of slot spaces.

Example 14 may include the thermal system of example 13 and/or any other example disclosed herein, in which the expandable heat exchanger further includes the down folds of the oblong sheet being positioned in corresponding slot spaces of the stationary section, and in which the expandable heat exchanger further comprises a slatted base plate attached to the up folds of the oblong sheet.

Example 15 may include the thermal system of example 9 and/or any other example disclosed herein, in which the stationary attachment member comprises a slatted top plate attached to the down folds of the oblong sheet, and in which the expandable heat exchanger further includes a slatted base plate attached to the up folds of the oblong sheet.

Example 16 may include the thermal system of example 8 and/or any other example disclosed herein, further including an expandable fan unit with an upper cover and moveable lower support, in which the lower support is engaged with a lower portion of the compartment and moves downward when the lower portion of the compartment is released.

Example 17 may include the thermal system of example 8 and/or any other example disclosed herein, further including the expandable heat exchanger being connected to a heat sink of the computing device.

Example 18 provides a method for dissipating heat from a computing device including providing the computing device with a compartment, the compartment comprises an upper portion and a lower portion, in which the lower portion of the compartment is releasably mateable to the upper portion of the compartment, providing an expandable heat exchanger with a first section in the compartment, the movable section including graphite heat spreaders and a movable second section, in which the movable section is engaged with the lower portion, and releasing the lower portion of the compartment from the upper portion of the compartment to produce an opening therebetween and extending the graphite heat spreaders of the movable section of the heat exchanger in a downward direction.

Example 19 may include the method of example 18 and/or any other example disclosed herein, further including providing a fan unit with an upper cover and movable lower support, in which the lower support is engaged with the lower portion of the compartment, and separating the lower support of the fan unit from the upper cover of the fan unit together with the release of the lower portion of the compartment from the upper portion of the compartment.

Example 20 may include the method of example 18 and/or any other example disclosed herein, in which the computing device includes a laptop with a laptop screen, in which the laptop screen pivotably covers the compartment, and lifting the laptop screen from the compartment to release the lower portion of the compartment.

It will be understood that any property described herein for a specific device may also hold for any device described herein. It will also be understood that any property described herein for a specific method may hold for any of the methods described herein. Furthermore, it will be understood that for any device or method described herein, not necessarily all the components or operations described will be enclosed in the device or method, but only some (but not all) components or operations may be enclosed.

The term "comprising" shall be understood to have a broad meaning similar to the term "including" and will be understood to imply the inclusion of a stated integer or operation or group of integers or operations but not the exclusion of any other integer or operation or group of integers or operations. This definition also applies to variations on the term "comprising" such as "comprise" and "comprises".

The term "coupled" (or "connected") herein may be understood as electrically coupled, as thermally coupled, and/or as mechanically coupled, e.g., attached or fixed or attached, or just in contact without any fixation, and it will be understood that both direct coupling or indirect coupling (in other words: coupling without direct contact) may be provided.

While the present disclosure has been particularly shown and described with reference to specific aspects, it should be understood by those skilled in the art that various changes in form and detail may be made therein without departing from the spirit and scope of the present disclosure as defined by the appended claims. The scope of the present disclosure is thus indicated by the appended claims and all changes which come within the meaning and range of equivalency of the claims are therefore intended to be embraced.

What is claimed is:

1. A device comprising:
    a compartment with an upper portion and a lower portion, wherein the lower portion of the compartment is releasably mateable to the upper portion of the compartment, wherein releasing the lower portion of the compartment from the upper portion of the compartment produces an opening therebetween;
    an expandable heat exchanger with a movable section positioned in the compartment, wherein the movable section retracts when the upper and lower portions of the compartment are mated and extends downward when the lower portion of the compartment is released; and
    the movable section of the expandable heat exchanger comprises graphite heat spreaders that extend from and retract to a stationary attachment member;
    wherein the graphite heat spreaders comprise a plurality of flexible sheets, each of the plurality of flexible sheets having a top portion and a bottom portion;
    wherein the stationary attachment member comprises a stationary section with a plurality of vertical copper sheets that form a plurality of slot spaces;
    wherein the expandable heat exchanger further comprises the top portion of each of the plurality of flexible sheets being positioned in a corresponding one of the slot spaces of the stationary section; and
    wherein each of the plurality of slot spaces comprises a guide for a respective one of the flexible sheets positioned in the corresponding one of the slot spaces.

2. The device of claim 1, wherein
    the stationary section is attached to the movable section, and wherein the graphite heat spreaders of the movable section retract to the stationary section when the upper and lower portions of the compartment are mated and extend from the stationary section when the lower portion of the compartment is released.

3. The device of claim 1, further comprising: a fan unit with an upper cover and a movable lower support, wherein the movable lower support moves downward when the lower portion of the compartment is released.

4. The device of claim 1, further comprising:
    a spring mechanism assisting the release of the lower portion of the compartment from the upper portion of the compartment.

5. The device of claim 1, wherein the device is a clamshell laptop computer and the compartment is a bottom portion of the clamshell laptop computer and the opening is located at a back section of the compartment.

6. The device of claim 5, wherein the clamshell laptop computer further comprises a laptop screen pivotably covering the compartment, wherein lifting of the laptop screen releases the lower portion of the compartment.

7. A thermal system comprising:
    an expandable heat exchanger with a movable section, wherein the expandable heat exchanger is positioned in a compartment of a computing device;
    wherein the movable section comprises graphite heat spreaders that extend from and retract to a stationary attachment member;
    wherein the graphite heat spreaders comprise a plurality of flexible sheets, each of the plurality of flexible sheets having a top portion and a bottom portion;
    wherein the stationary attachment member comprises a stationary section with a plurality of vertical copper sheets that form a plurality of slot spaces;
    wherein the expandable heat exchanger further comprises the top portion of each of the plurality of flexible sheets being positioned in a corresponding one of the slot spaces of the stationary section; and wherein each of the plurality of slot spaces comprises a guide for a respective one of the flexible sheets positioned in the corresponding one of the slot spaces.

8. The thermal system of claim 7, wherein the expandable heat exchanger further comprises a slotted base plate attached to the bottom portion of the plurality of flexible sheets.

9. The thermal system of claim 7, further comprising:
an expandable fan unit with an upper cover and a moveable lower support, wherein the moveable lower support is engaged with a lower portion of the compartment and moves downward when the lower portion of the compartment is released.

10. The thermal system of claim 7, wherein the expandable heat exchanger is connected to a heat sink of the computing device.

* * * * *